United States Patent [19]

Higgins et al.

[11] Patent Number: 4,953,143
[45] Date of Patent: Aug. 28, 1990

[54] MULTIPLE FREQUENCY SYNTHETIC APERTURE SONAR

[75] Inventors: Francis J. Higgins; Chester D. Loggins, Jr.; James T. Christoff, all of Panama City, Fla.

[73] Assignee: The United States of America as represented by the Secretary of the Navy, Washington, D.C.

[21] Appl. No.: 237,352

[22] Filed: Jan. 12, 1981

[51] Int. Cl.$^5$ ............................................. G01S 15/00
[52] U.S. Cl. ....................................................... 367/88
[58] Field of Search ................................. 367/88, 101

[56] References Cited

U.S. PATENT DOCUMENTS

| | | | |
|---|---|---|---|
| 3,121,868 | 2/1964 | Hausz et al. | 343/5 |
| 3,178,711 | 4/1965 | Case, Jr. | 343/16 |
| 3,458,854 | 7/1969 | Murphree | 367/101 |
| 3,683,325 | 8/1972 | Viahos | 367/93 |
| 3,705,381 | 12/1972 | Pipkin | 367/101 X |
| 3,882,444 | 5/1975 | Robertson | 367/92 |
| 3,928,839 | 12/1975 | Warner et al. | 367/101 |
| 3,943,482 | 4/1976 | Murphree et al. | 367/101 |
| 3,950,723 | 4/1976 | Gilmour | 367/88 X |
| 4,088,978 | 5/1978 | Gilmour | 367/88 |

Primary Examiner—Thomas H. Tarcza
Assistant Examiner—Daniel T. Pihulic
Attorney, Agent, or Firm—Harvey David; John Becker; Sol Sheinbein

[57] ABSTRACT

A dual frequency, synthetic aperture, sonar system includes a transmitter for projecting insonifying pings alternatively at first and second frequencies and a linear receiving array carried by a vehicle so as to receive returns from said pings. The first and second frequency returns are separated and subjected to processing in parallel channels where they are resolved into in-phase and quadrature components for subsequent phase-error correction, coherent addition, and synthetic aperture beamforming.

8 Claims, 2 Drawing Sheets

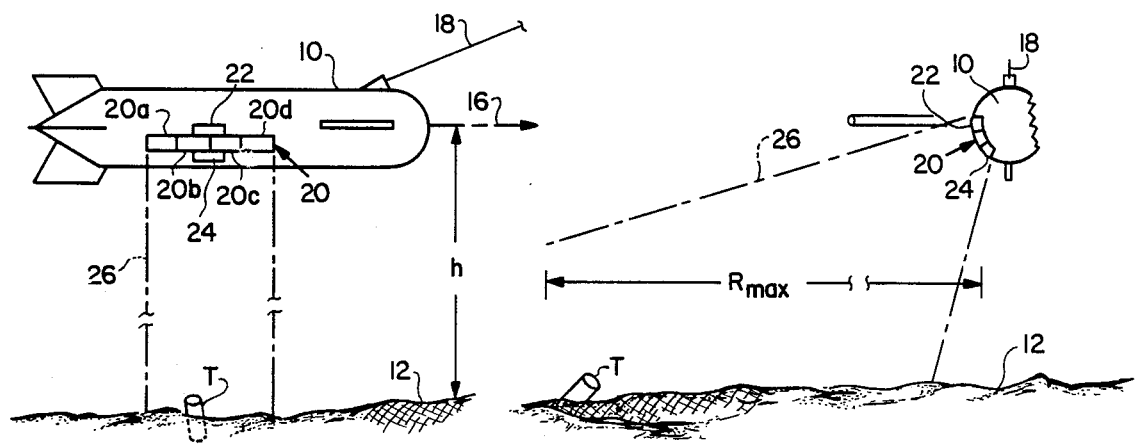
FIG. 1
FIG. 2
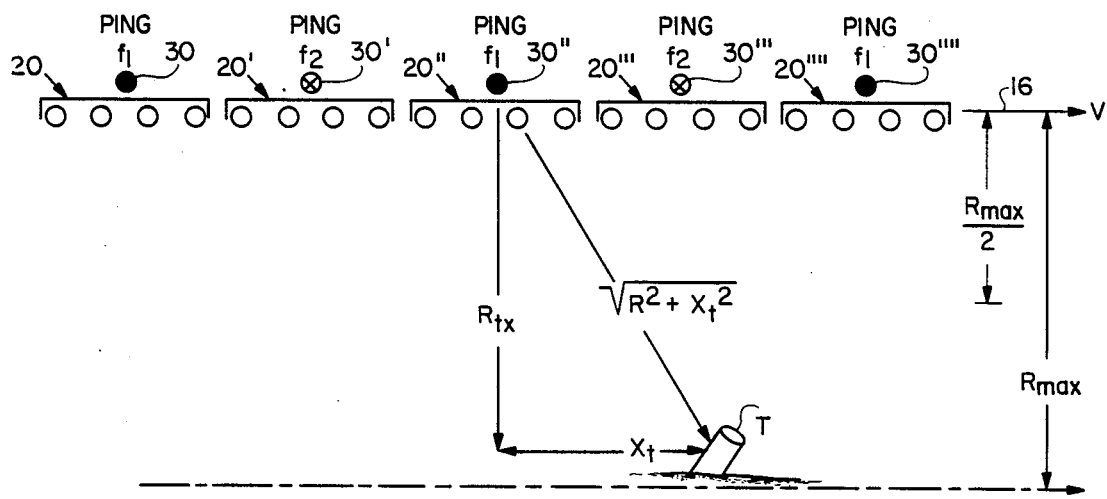
FIG. 3
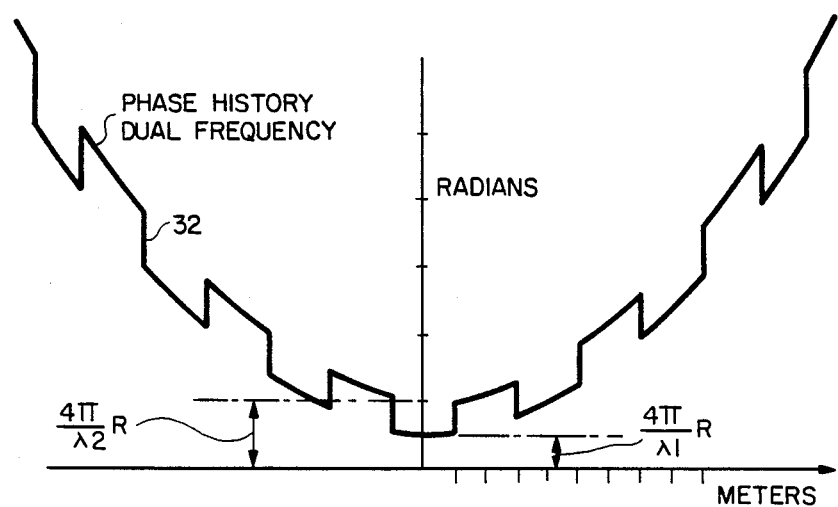
FIG. 4

MULTIPLE FREQUENCY SYNTHETIC APERTURE SONAR

BACKGROUND OF THE INVENTION

This invention relates generally to sonar systems, and more particularly to synthetic aperture sonar particularly useful for bottom mapping, and the like.

Two requirements in a practical bottom mapping sonar are high resolution and a large area coverage rate. A variety of towed vehicle carried, side-looking sonar systems have been implemented or proposed, including, synthetic aperture sonars which have been shown capable of increasing resolution. The synthetic aperture sonar differs from conventional fixed aperture sonars in that the horizontal aperture of the synthetic aperture sonar depends upon horizontal motion of the vehicle carrying the receiving element. It has further been shown that by using multiple receiver elements in a vernier array, as described in U.S. patent application Ser. No. 776,800, filed Mar. 4, 1977, by Chester C. Loggins, Jr. and assigned to the assignee hereof, the effective along-track sampling rate can be increased, resulting in an increase in area coverage rate by a factor substantially equal to the number of receiving elements.

There are, of course, practical limits to the number of elements of a vernier synthetic aperture array. These include, but are not necessarily limited to, vehicle size, signal processing requirements, and cost. Accordingly, other approaches to increasing still further the resolution and area coverage rates of synthetic aperture sonars have been sought.

Area coverage may be considered to be dependent at least in part upon the speed of travel of the vehicle and on the range capability of the sonar, while resolution is dependent in part on sonar signal frequency and pulse repetition rate, all of which must take into consideration the limiting factor of the low velocity of sound in water.

SUMMARY OF THE INVENTION

With the foregoing in mind, it is a principal object of this invention to provide an improved synthetic aperture sonar that is characterized by an increased rate of area coverage.

Another important object of this invention is the provision of a synthetic aperture sonar system wherein the vehicle need not be constrained to operation only at a single predetermined height above bottom.

As another object, the invention aims to provide for an increase in rate of area coverage, by a factor of about two, with a minimum increase in system complexity, vehicle size, loss of resolution or range capabilities.

Yet another object is to accomplish the foregoing through the use of at least first and second discrete frequencies of operation, projected alternatively to insonify the field of interest, a vernier receiving array, and signal processing means operative to phase detect target echo signals for each of the two or more frequencies, and to coherently combine the detected signals to form a synthetic aperture output.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 1 is a side elevational view of a towed vehicle carrying a dual frequency synthetic aperture sonar embodying the invention;

FIG. 2 is a fragmentary front view of the vehicle of FIG. 1, and illustrating a side-looking sonar coverage sector.

FIG. 3 is a diagrammatic illustration of ping sequencies of the sonar of this invention;

FIG. 4 is a graphic illustration of a phase history of the sonar;

DESCRIPTION OF THE PREFERRED EMBODIMENTS

Figure 5:
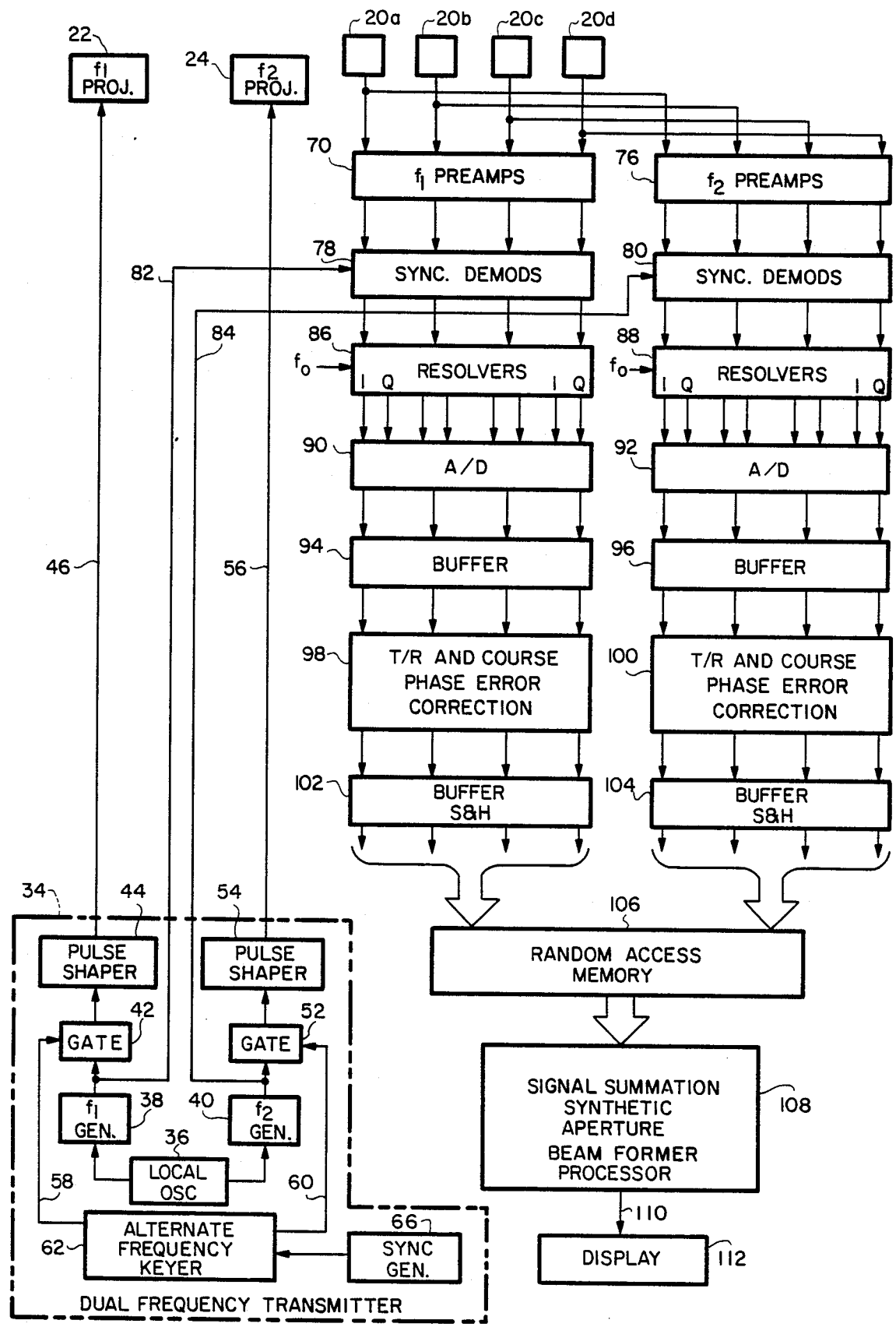
FIG. 5 is a schematic illustration, in block form, of the dual frequency synthetic aperture sonar.

Referring to FIGS. 1 and 2, a towed, underwater vehicle 10 is adapted to travel substantially at a predetermined altitude h above the bottom 12 and along a horizontal track or axis of travel 16. A tow cable 18 connects to the towing craft (not shown) and may conveniently serve also as a power supply line and telemetry link to the tow craft. According to the invention, the vehicle 10 is equipped with a linear, multiple element hydrophone array 20 and first and second frequency acoustic projectors 22 and 24, all forming part of a dual frequency, vernier, synthetic aperture sonar system. The array 20, which in the embodiment being described comprises four receiving elements or hydrophones 20a, 20b, 20c, and 20d, is applied parallel to the axis of travel 16 of the vehicle and is oriented to receive acoustic echoes from within a predetermined side-looking sector 26 insonified by the projectors 22 and 24. While the system pertaining to only one side of the vehicle is being described, it will be understood that a corresponding system would normally be provided on the other side of the vehicle, as well.

Referring now to FIG. 3, consider the array 20 to be moving to the right along the vehicle track 16 with a speed S through successive positions as shown at 20, 20″---20″″. In each of these positions, an acoustic pulse or ping is transmitted by the projectors 22 and 24 at one or the other of two frequencies $f_1$ and $f_2$, the pings being alternated in frequency at each successive position. Thus, when the array is in its positions at 20, 20″, and 20″″, the projector transmits pings 30, 30″, and 30″″ frequency $f_1$, whereas when the array is in positions 20′, 20‴, etc., the projector transmits pings 30′, 30‴, etc. of frequency $f_2$. A ping of alternate frequency occurs, therefore, each time the array 20 moves a distance equal to d/2.

Now, when the array is moving through a position 20, it receives echoes reflected from the bottom or targests due to pings of frequencies $f_1$ and $f_2$ transmitted earlier during two or preceding positions of the array. It will be recognized that, because of the speed C of sound in water and the forward velocity V of the array, there will be a finite maximum range $R_{max}$ which the $f_1$ ping 30 can transmit in both transmitted and reflected directions and arrive at the array when it has moved a distance 2d to its position at 20″. That maximum range $R_{max}$ will be the same which can be transited in both directions by the preceding $f_2$ ping 20′ received as an echo at array position 20‴. It will also be recognized that, for the same forward velocity V of the array the maximum range is twice the range $$\frac{(R_{max})}{2}$$

at which an echo can be received from a ping of either frequency $f_1$ or $f_2$ when the array has moved only one successive position, or the distance d, as occurs in a conventional or prior art synthetic aperture sonar.

Referring still to FIG. 3, considering a target T out at a range R from the track 16 and at a distance $X_t$ ahead of the closest point of approach of a given hydrophone 20c, the phase $\phi_1(X_t,R)$ of the return or echo, relative to a ping at frequency $f_1$, will be substantially in accordance with $$\phi_1(X_t, R) = \frac{4\pi}{\lambda_1} \sqrt{R^2 + X_t^2}, \text{ and}$$

the phase of the return due to a ping at frequency $f_2$ with $$\phi_2(X_t, R) = \frac{4\pi}{\lambda_2} \sqrt{R^2 + X_t^2}.$$

A phase history for a target being scanned by a dual frequency synthetic aperture sonar can therefore be determined for each element of a multiple element array 20. Such a phase history is graphically illustrated by the curve 32 in FIG. 4. It will be noted that the curve 32 is modulated in accordance with the wavelengths $\lambda_1$ and $\lambda_2$ corresponding to the frequencies $f_1$ and $f_2$ of the pings. With the phase history known for each of the multiple elements of the array 20 and for different targets ranges, an appropriate matched filter can be constructed according to known principles for the dual frequency system whereby signals corresponding to the increments of energy returned by the target and received by the array 20 can be processed and coherently added to produce a gain.

Referring now to FIG. 5, the embodiment of the invention being described as one example of a dual frequency synthetic aperture sonar comprises a transmitter, indicated generally at 34, including a local oscillator 36, driving generators 38 and 40 of the frequencies $f_1$ and $f_2$, respectively. Pulses of the $f_1$ frequency output of source 38 are applied via gate 42, a pulse shaper 44, and line 46 to the $f_1$ frequency projector 22. Similarly, pulses of the $f_2$ output of source 40 are applied via a gate 52, a pulse shaper 54, and line 56 to the $f_2$ frequency projector 24. Gating signals are alternately applied to the gates 42, 52, via line 58, 60 from an alternate frequency keyer 62. The keyer 62 is triggered at the desired pulse repetition rate by suitable sync signals, line 64, generated by a sync signal generator 66.

Echo returns arriving at the array 20 are converted by the hydrophones 20a, 20b, 20c and 20d, to analog electrical signals and are applied, in individual channels as shown, to banks of preamplifiers 70 and 72 which have pass-band amplification characteristics for the frequencies $f_1$ and $f_2$, respectively, and hence serve as filter stages separating the $f_1$ and $f_2$ signals. The preamplifier banks may advantageously include time varied gain and adaptive gain control features for return signal normalization purposes.

The outputs of the preamplifiers 70 corresponding to the four $f_1$ channels are applied as shown to a bank of synchronous demodulators 78, while the outputs of the preamplifiers 76 corresponding to the four $f_2$ channels are applied as shown to a bank of synchronous demodulators 80. Frequencies $f_1$ and $f_2$ are used as demodulating references applied as indicated via lines 82 and 84 to the demodulators 28 and 80. The demodulated outputs in the two sets of four channels are applied as shown to banks of resolvers 86 and 88, which may conveniently be in the form of mixers. The resolvers provide, for each input channel, an in-phase amplitude component output and a quadrature component output, for example by mixing the incoming signals with a mixing frequency $f_m$ derived from the local oscillator 36 and with a quadrature version $f_m+90°$ thereof.

The amplitude and phase carrying output signal pairs of the resolvers 86, 88 are subjected to analog-to-digital conversion in banks of converters 90, 92, respectively, for serial application of the digital outputs in each channel to input/output buffers 94, 96. Because of the transit times involved in acoustic projection and echo returns, and the rate of movement of the vehicle 10, there are introduced a set of phase errors referred to as transmit/receive errors. In addition, the vehicle 10 does not fly a straight line, but experiences more or less random or psuedo-random perturbations from the predetermined course 16. Accordingly, transmit/receive error and random motion error correction stages 98, 100 are included that perform corrections on the outputs of the buffers 94, 96, for example in the manner described in the aforementioned U.S. patent application, Ser. No. 776,800.

The corrected signals in the respective $f_1$ and $f_2$ data channels are collected as range cell sequential inputs to input/output buffers 102, 104, for following output from those buffers as input to a random access memory 106 for storage by range and azimuth address. When the memory 106 is full, following a determinable period of data collection, it is accessed and the data is read out in azimuth sequential form, during a subsequent period, to a signal summation and synthetic aperture beamforming processor 108. New data is read into the memory 106 over the olds as the latter is accessed. The processor 108, which may be either digital or analog in function, coherently adds the target returns in a known manner to provide a resolution enhancing gain in the output 110 thereof representing target azimuth and range. The output is available for application to a utilization means such as a suitable display means 112.

Obviously, other embodiments and modifications of the subject invention will readily come to the mind of one skilled in the art having the benefit of the teachings presented in the foregoing description and the drawing. It is therefore, to be understood that this invention is not to be limited thereto and that said modifications and embodiments are intended to be included within the scope of the appended claims.

What is claimed is:

1. A multiple frequency synthetic aperture sonar for use in conjunction with an underwater vehicle that travels at a predetermined velocity substantially along a horizontal linear course, said sonar comprising:

projector means, carried by said vehicle, for insonifying a predetermined sector laterally of said course;

transmitter means for energizing said projector means so as to alternatively project at a predetermined repetition rate first and second pulses of acoustic energy of first and second frequencies, respectively;

hydrophone means, carried by said vehicle, for receiving acoustic energy returned from within said sector and providing corresponding electrical first and second return signals resulting from said first and second pulses;

means, centered on said first and second frequencies, for separating said first and second return signals for subsequent processing;

first and second processing means for demodulating, resolving and phase error correcting said first and second return signals, respectively, to provide first and second processed return signals;

memory means, for collection and storage of said first and second processed return signals as inputs during a predetermined period between like pulses and reading out said processed return signals during subsequent periods; and summation means for coherently adding said first and second processed return signals of said predetermined and subsequent periods to provide a synthetic aperture output signal.

2. A multiple frequency synthetic aperture sonar as defined in claim 1, wherein:

said hydrophone means comprises a plurality of receiving elements arranged in a linear array of predetermined length extending parallel to the axis of travel of said vehicle;

said first and second processing means each comprise a plurality of channels corresponding to said receiving elements; and said pulse repetition rate and the velocity of said vehicle are so related that said array moves about two array lengths during each period between like ones of said first and second pulses.

3. A multiple frequency synthetic aperture sonar as defined in claim 2, and wherein said transmitter means comprises sources of said first and second frequencies;

first and second gate means connecting said first and second sources to said projector means; and keyer means for alternatively enabling said first and second gate means.

4. A multiple frequency synthetic aperture sonar as defined in claim 3, wherein:

each of said channels of said first and second processing means comprises synchronous demodulator means, resolver means, and phase error correction means, arranged in series.

5. A multiple frequency synthetic aperture sonar as defined in claim 4, and wherein:

each of said channels is representative of azimuth of said first and second processing means further comprises analog to digital converter means for converting in-phase and quadrature resolved signals to digital signal form representative of range cell data in series.

6. A multiple frequency synthetic aperture sonar as defined in claim 5, and wherein:

said storage of said first and second processed signals is addressed by range and azimuth and said readout is in an azimuthal series form.

7. A side-looking synthetic aperture sonar system comprising:

an underwater vehicle adapted to be moved along a predetermined horizontal path at a predetermined velocity and height above bottom;

first and second acoustic projectors carried by said vehicle for alternatively projecting first and second pings of first and second frequencies, respectively, laterally from said vehicle so as to insonify succeeding sectors as said vehicle advances;

a plurality of acoustic receiving elements arranged in a linear array of predetermined length extending parallel to said path and directed to receive target echoes from said sectors;

transmitter means for alternatively energizing said projectors so that said first and second pings are spaced by time periods that equal the time required for said vehicle to advance a distance substantially equal to said predetermined array length at said predetermined velocity, and said velocity being such that said time periods substantially equal the transit time of a ping from said projector to a target substantially at the maximum range of said sonar;

a first plurality of signal processing channels corresponding to said plurality of receiving elements;

a second plurality of signal processing channels corresponding to said plurality of receiving elements;

a first plurality of band-pass means for directing return signals due to said first frequency pings to said first plurality of signal processing channels;

a second plurality of band-pass means for directing return signals due to said second frequency pings to said plurality of signal processing channels;

said first and second pluralities of signal processing channels each comprising means for demodulating said return signals and for resolving thereof into in-phase and quadrature components; and synthetic aperture processing means, responsive to said in-phase and quadrature signals to coherently combine said signals to represent the output of a synthetic aperture.

8. A side-looking synthetic aperture sonar system as defined in claim 7, and wherein:

said first and second frequencies are derived from the same oscillator means.

* * * * *